May 3, 1949.                H. T. HERBST                2,468,805
             FLUID COOLED GAS BLANKETED ARC WELDING TORCH
Filed March 8, 1946                                 2 Sheets-Sheet 1

INVENTOR
HARRY T. HERBST
BY
    Ed Greenewald
       ATTORNEY

May 3, 1949. H. T. HERBST 2,468,805
FLUID COOLED GAS BLANKETED ARC WELDING TORCH
Filed March 8, 1946 2 Sheets-Sheet 2

INVENTOR
HARRY T. HERBST
BY
ATTORNEY

Patented May 3, 1949

2,468,805

UNITED STATES PATENT OFFICE 2,468,805

FLUID COOLED GAS BLANKETED ARC-WELDING TORCH

Harry T. Herbst, Roselle, N. J., assignor to The Linde Air Products Company, a corporation of Ohio Application March 8, 1946, Serial No. 652,924

8 Claims. (Cl. 219—15)

This invention relates to gas blanketed arc welding torches of the type disclosed in the Meredith Patent No. 2,376,265 issued May 15, 1945.

In torches of this character it is desirable to increase the welding current, in order to increase the speed of the welding operation, or to enable the torch to weld stock of greater thickness, or to increase the quantity of metal to be deposited. However, the heat generated by the arc is proportional to the square of the current, and soon becomes excessive. If the metal mass of the torch is increased in order to dissipate the excess heat, the torch becomes too heavy for convenient handling, in addition to the discomfort of the heat. When the weight is kept down and the current is increased, the excess heat tends to burn out the torch, whether the gripping means, the nozzle, or the insulation.

It is therefore the main object of the present invention to provide means for cooling the torch to permit the same to withstand heavy welding current while maintaining the weight of the torch sufficiently light for convenient manipulation.

Another problem attendant upon heavy welding current is the tendency to arcing from the electrode to the metal nozzle even though the metal nozzle is insulated from the electrode gripping means, particularly when high-frequency, high-voltage alternating electric current is superimposed upon the welding current, and it is therefore another object to construct the nozzle for the torch of non-conducting material which will prevent such arcing.

When the amperage of the welding current is increased the size of the conductor for the current must be increased, so that a point is reached when the weight and rigidity of the conductor required is inconvenient for manipulation, and a further object of the invention is to cool the conductor which supplies the welding current, whereby a smaller and more flexible conductor may be employed notwithstanding the increased current.

Further objects are to provide a current protective device such as a fuse, and to cool the fuse to protect the torch and cable from damage due to failure of the cooling system.

Other objects and features of novelty will be apparent as the following description proceeds, with reference to the accompanying drawings, in which Fig. 1 is a cross-section through the torch and fuse assembly according to the preferred embodiment of the present invention;

Figure 1:
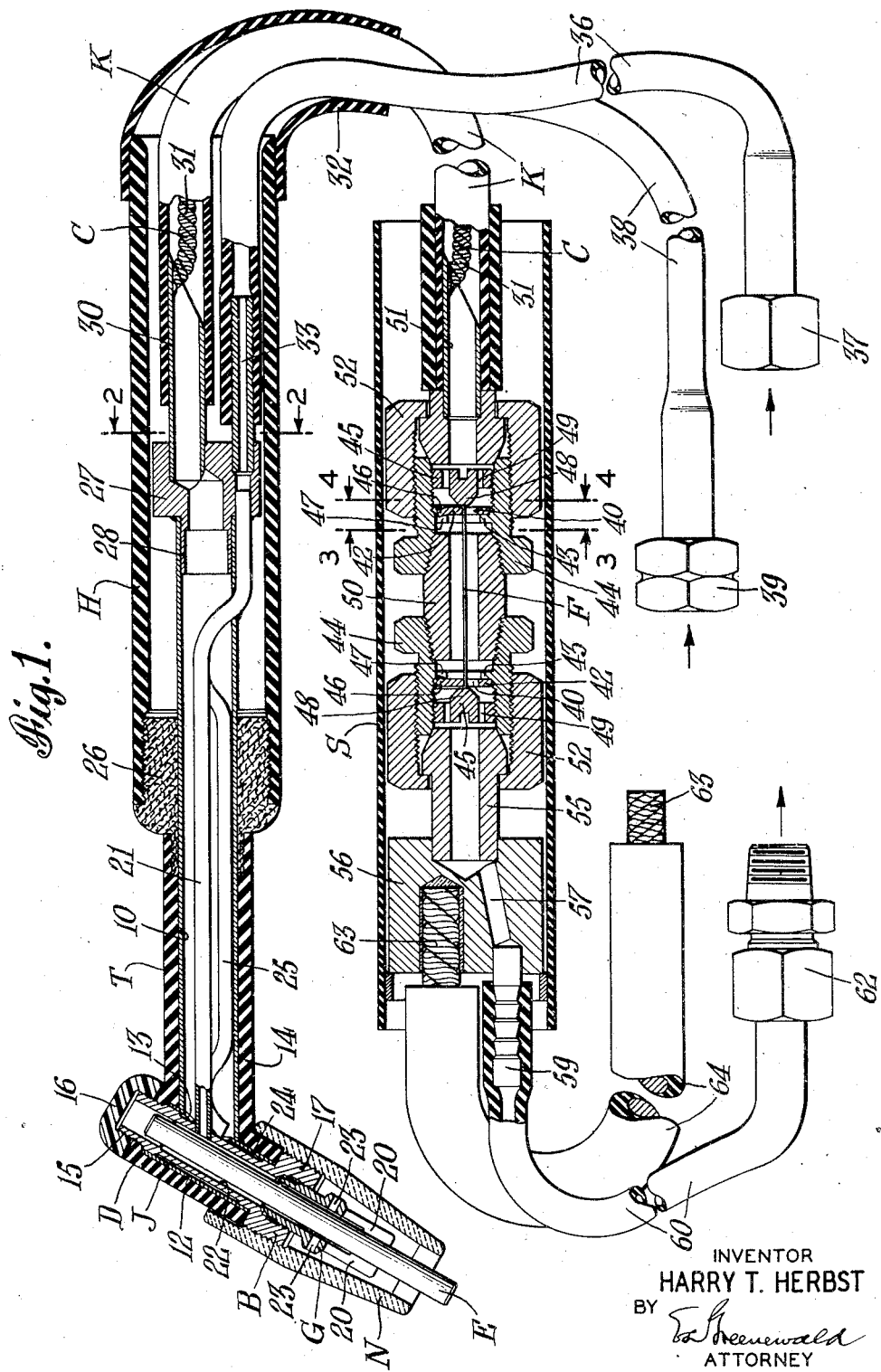

The water-cooled inert gas blanketed arc welding torch according to the present invention comprises an insulated tubular shank T provided with a handle H which is a rigid tube of insulating material such as fiber, plastic composition, or the like, and a head D which supports the electrode E and the nozzle N. The nozzle N is of refractory insulating material, preferably a ceramic such as spark plug porcelain, or fired soapstone lava. The electrode E is formed of a refractory metal such as tungsten, molybdenum, or the like. The electrode E is slidably mounted in an electrode holder B within the head D and held in adjusted position by gripping means G. The holder B and the torch shank are water-cooled, the holder B having a water jacket J which discharges the cooling water through the hollow shank T. The water outlet hose K contains an electric cable C, which supplies electric welding current through the shank T, holder B, and gripping means G to the electrode E. The cable C contains a fuse F which is mounted in a water-cooled fuse assembly housed within an insulated shield S, of similar construction to the handle H.

The torch shank T comprises a metal tube 10 with an angular extension 12 to form the head D. Preferably the extension 12 has an aperture 13 intermediate its ends, and the apertured portion is welded to the open end of the tube 10 which is desirably cut off at an obtuse angle. The outer surface of this joined frame is completely covered with a continuous layer of insulating material 14, preferably molded rubber or other plastic composition.

The electrode holder B is mounted in the tubular extension 12, and is provided with an axial bore slidably receiving the electrode E. The inner end of the holder B is threaded as at 15 to receive a cap or cover 16 of insulating material to preserve the over-all continuity of the torch insulation. The outer end of the holder B is enlarged as at 17 for the thickness of the insulation 14 and is threaded to receive the ceramic nozzle N. The outer end of the bore of the electrode holder is enlarged and internally threaded to receive the electrode gripping means G, the outer end of which is slotted to form spring fingers 20. The electrode gripping means G is preferably removable and replaceable as a series in which the spring fingers 20 are respectively constructed to receive larger or smaller diameters of electrodes to suit the amount of current employed.

For supplying inert gas to the ceramic nozzle N, a tube 21 is mounted inside the tube 10, and the gas outlet end of the tube 21 is welded in an aperture in the holder B. It should be noted that the bore in the holder is enlarged below the threads 15, forming an annular chamber 22 around the electrode E and receiving gas from the tube 21. The bore in the gripper G is similarly enlarged to continue the annular chamber, and radial holes 23 are drilled in the gripping means G to pass gas from the annular chamber 22 to the interior of the nozzle N.

The water jacket for the electrode holder B is formed by a portion of its outer surface between the threads 15 and the enlargement 17 being of reduced diameter to cooperate with the inner surface of the extension 12 to form an annular chamber 24 communicating through the aperture 13 with the interior of the tube 10. Cooling water is supplied to this jacket by a smaller tube 25 which extends forward inside the main tube 10. The outlet end of the water tube 25 is bent downwardly to direct the flow therefrom down through the aperture 13 toward the bottom of the water jacket. After passing through the water jacket and around the electrode holder the cooling water flows back through the aperture 13 and fills the interior of the main tube 10.

For connection to the handle H, the tube 10 has mounted thereon a bushing 26 of fiber or other insulation continuing the over-all insulation of the torch. The handle H is screwed on to the outside of the bushing 26. The rear end of the tube 10 is welded to a fitting 27 which receives the supply tubes for the torch, an inner sleeve 28 being provided to reinforce the tube and facilitate the various soldered joints.

The interior of the main tube 10 communicates with an offset passage in the fitting 27, in the rear end of which is soldered a water nipple 30. The nipple 30 is preferably cut off at an oblique angle and has a flexible cable 31 soldered thereto, being preferably constructed of stranded copper wire. The flexible water outlet hose K is preferably of rubber, and is fitted over and encloses both the cable 31 and the nipple 30, being secured over the latter by a water-tight connection.

Figure 2:
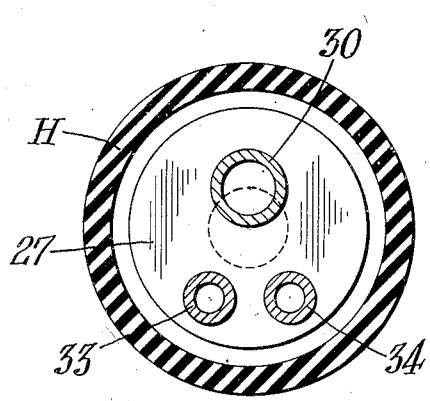
Fig. 2 is a cross-section through the torch handle taken along the line 2—2 of Fig. 1.
Figure 3:
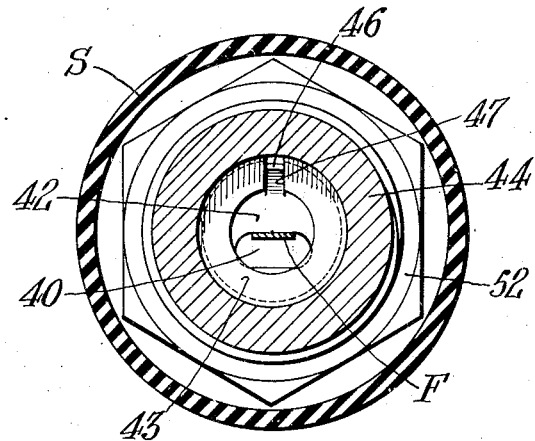
Fig. 3 is a cross-section through the fuse assembly taken along the line 3—3 of Fig. 1.
Figure 4:
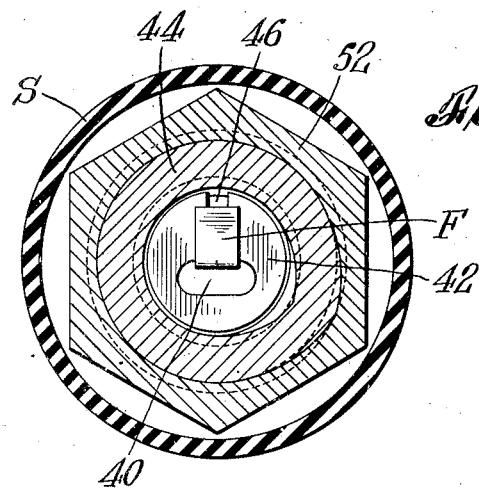
Fig. 4 is a cross-section through the fuse assembly taken along the line 4—4 of Fig. 1.

Below the water nipple 30 are two smaller nipples 33 and 34 as shown in Fig. 2. These nipples are soldered in the ends of passages which pass through the fitting 27 outside of the offset passage. The nipple 33 communicates with the gas tube 21, the end of which is welded in the opposite end of its passage. The nipple 34 communicates with the rear end of the water tube 25 which supplies the cooling water to the water jacket 24.

For supplying gas to the nipple 33, a flexible hose 36 of rubber or the like is fitted over the projecting end of the nipple 33 in gas-tight relation. A suitable coupling 37 connects the other end of the hose 36 to a source of gas, such as helium or argon or other inert gas, preferably monatomic.

For supplying water to the nipple 34 a flexible hose 38 of rubber or the like is fitted over the projecting end of the water nipple in water-tight relation, and is connected by a coupling 39 to a source of cooling water, preferably under a pressure of from 10 to 75 pounds per square inch.

The three hoses K, 36, and 38 which pass out of the rear end of the tubular handle H are protected by a flexible guard 32, which may comprise a length of large diameter rubber hose.

Figure 5:
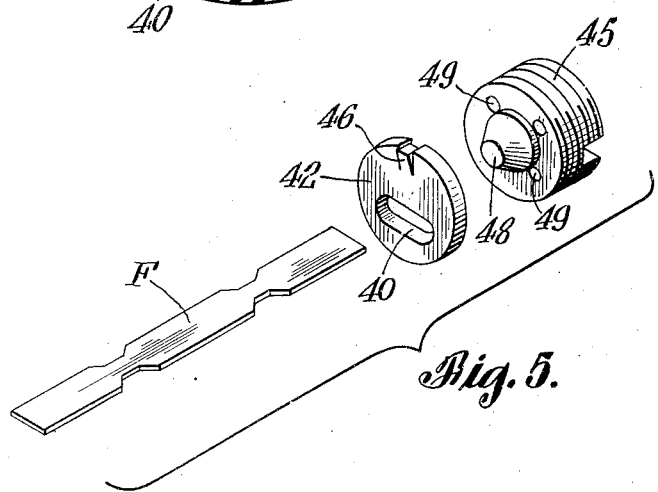
Fig. 5 is an exploded view of the fuse mounting.

The water outlet hose K leads to a fuse assembly within the shield S. As shown in Fig. 5, each end of the fuse F passes through a slot 40 in an insert or centering disc 42, which bears against a shoulder 43 in a holder 44, and is clamped thereagainst by a lock screw 45, rotation of the insert being prevented by a lug 46 engaging a slot 47 in the shoulder 43. The end of the fuse is bent up against the outer side of the centering disc 42, and is clamped thereagainst by a contact point 48 on the lock screw 45. The screw 45 has longitudinal passages 49 for the cooling water.

The fuse F is housed within a central nipple 50, which has a holder 44 at each end. The water outlet hose K is fitted over a water nipple 51 in water-tight relation, the outer end of the nipple 51 being cut off at an angle, and the conductor 31 being brazed thereto as shown. A coupling 52 connects the nipple 51 to the adjacent holder 44. A similar coupling secures to the other holder 44 a nipple 55, which is welded in a fitting 56 which has a passage 57 leading to a water outlet nipple 59 connected by a flexible hose 60 to a water outlet connection 62. Soldered into a socket in the fitting 56 is a conductor 63 of heavy stranded copper wire covered with suitable insulation 64 and receiving electric welding current from a suitable source of power.

In operation, the electric welding current passes from the conductor 63 through the fitting 56, nipple 55, coupling 52, holder 44, screw 45, contact 48, to the fuse F; and similarly in reverse to the nipple 51, conductor 31, nipple 30, fitting 27, tube 10, holder 16, fingers 20, to the electrode E to strike the arc.

Meantime gas from the coupling 37 passes through the hose 36, nipple 33, tube 21, and holder B, and through holes 23 to the interior of the nozzle N, so as to flow outwardly around the arc.

At the same time, cooling water from the coupling 39 passes through the hose 38, nipple 34, and tube 25 through the aperture 13 to the water jacket J and returns through the aperture 13 to the interior of the tube 10, through the offset passage in the fitting 27, nipple 30, hose K, nipple 51, coupling 52, holes 49, slot 40, into the nipple 50, and similarly in reverse to the nipple 55, passage 57, hose 60, to the outlet coupling 62.

The fuse F is of smaller rating than the welding current, but operates at overload due to the cooling action. Hence upon failure of the cooling system, the fuse will blow or burn out and break the welding circuit, even though there may be no increase in amperage of the circuit.

Figure 6:
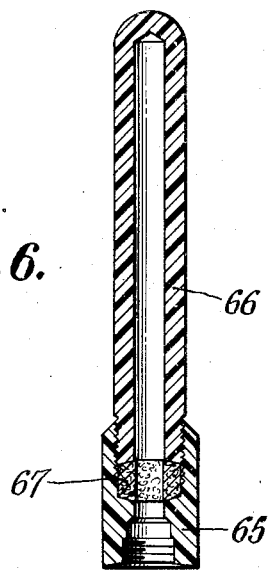
Fig. 6 is a cross-section of an extension cap for long electrodes.

When it is desired to provide a longer electrode, a cap as shown in Fig. 6 may be employed. This cap has a threaded end 65 to engage the threads 15 on the electrode holder, and an elongated shield 66 of insulation having a registering axial bore. The shield 66 is screwed into the end 65 and forms a stuffing box for packing material 67 which bears against the electrode to give additional gripping action on the larger sizes of electrodes to prevent them from slipping when welding with high current values.

I claim:

1. In a gas blanketed arc welding torch, a rigid metal tube, an electrically conductive electrode holder electrically connected to said tube, electrically conductive electrode contacting means mounted on said holder, a nozzle mounted on said electrode holder and extending beyond said contacting means toward the arc to form with the electrode an annular orifice, gas passage means for supplying gas through said rigid metal tube and said electrode holder along the electrode to the interior of said nozzle to flow out through said annular orifice, rigid annular walls outside of said electrode holder and forming a cooling jacket connected with said rigid metal tube, cooling fluid passage means communicating with said jacket, a flexible tube connected to said rigid metal tube for receiving cooling fluid therethrough from said jacket, and a flexible metal cable electrically connected to said rigid metal tube passing along inside said flexible tube and subject to the cooling fluid action for supplying electric welding current through said electrode holder and contacting means to the electrode.

2. In a gas blanketed arc welding torch as claimed in claim 1, in combination with a circuit protective device in said flexible cable and subject to the action of said cooling fluid in said flexible tube heated by said jacket and returning therefrom for interrupting the welding current in response to excessive temperature due to failure of the cooling system.

3. In a gas blanketed arc welding torch, a metal tube forming the frame of the torch handle, a metal electrode holder joined to said metal tube at an angle thereto the outer surface of said tube and holder and their joint being covered with electrically insulating material, electrically conductive electrode contacting means mounted on said holder, a nozzle mounted on said electrode holder and extending beyond said contacting means toward the arc to form with the electrode an annular orifice, gas passage means for supplying gas to the interior of said nozzle to flow out through said annular orifice, rigid annular walls outside of said electrode holder and forming a cooling jacket, said metal handle tube having a passage therethrough for supplying cooling fluid to said cooling jacket, and an electric cable connected to said metal handle tube for supplying electric welding current through said electrode holder and contacting means to the electrode.

4. In a gas blanketed arc welding torch, a metal tube forming the frame of the torch handle, a tubular metal electrode holder joined intermediate its ends to said metal tube at an angle thereto, electrically conductive electrode contacting means mounted on said electrode holder, a nozzle mounted on said electrode holder and extending beyond said contacting means toward the arc to form with the electrode an annular orifice, gas passage means for supplying gas to the interior of said nozzle to flow out through said annular orifice, means for supplying electric welding current through said metal tube, electrode holder and contacting means to the electrode, the outer surface of said metal tube and electrode holder being covered with electrically insulating material, and an electrically insulated elongated cap secured to the rear end of said electrode holder and above its joint to said metal tube and having an internal bore aligned with the interior of said electrode holder for housing the rear end of a long electrode and continuing the electrical insulation of the outer surface of said metal tube and electrode holder.

5. In a gas blanketed arc welding torch, a metal tube forming the frame of the torch handle, a tubular metal electrode holder joined intermediate its ends to said metal tube at an angle thereto, electrically conductive electrode contacting means for engaging an electrode in said holder and supplying electric welding current thereto, a nozzle mounted on said electrode holder outside of said contacting means, a gas passage extending through said metal tube and connected to the interior of said electrode holder for supplying gas therethrough to the interior of said nozzle, the outer surface of said metal tube and electrode holder being covered with electrically insulating material, and an electrically insulating cap closing the rear end of the electrode holder above its joint to said metal tube and covering the rear end of an electrode in said holder and continuing the electrical insulation of the outer surface of said metal tube and electrode holder and preventing escape of gas from the rear end of the interior of the electrode holder.

6. In a gas blanketed arc welding torch, an electrically conductive electrode holder, electrically conductive electrode contacting means mounted on said holder, a nozzle mounted on said holder and extending beyond said contacting means toward the arc to form with the electrode an annular gas passage terminating in an annular orifice, gas passage means passing through said electrode holder for supplying gas to the interior of said nozzle to flow along the electrode through said annular gas passage and out through said orifice, a cooling jacket surrounding said electrode holder, a metal tube constituting both an electric current conductor and a fluid conduit connected to said cooling jacket, means for supplying cooling medium to the interior of said metal tube adjacent its connection to said cooling jacket, a flexible tube connected to the other end of said metal tube for conducting said medium away from said jacket, and a flexible metal conductor inside said flexible tube and electrically connected to said metal tube for supplying electric welding current therethrough and through said electrode holder and gripping means to said electrode.

7. In a gas blanketed arc welding torch, an electrically conductive electrode holder, electrically conductive electrode contacting means mounted on said holder, a nozzle mounted on said holder and extending beyond said contacting means toward the arc to form with the electrode an annular gas passage terminating in an annular orifice, gas passage means for supplying gas to the interior of said nozzle to flow out through said orifice, a cooling jacket surrounding said electrode holder, means for supplying cooling fluid to flow around said cooling jacket, a metal tube constituting both an electric current conductor and a fluid discharge conduit connected at one end to said cooling jacket, a flexible tube connected to the other end of said metal tube for conducting said fluid therethrough away from said cooling jacket, a flexible metal conductor inside said flexible tube and electrically connected to said metal tube for supplying electric welding current therethrough and through said holder and gripping means to said electrode, and a temperature responsive circuit protective device interposed intermediate the ends of said flexible metal conductor inside the conduit formed by said flexible tube and subject to the temperature of said fluid returning from said cooling jacket for interrupting the welding current in response to excessive temperature rise due to failure of the cooling system.

8. In a gas blanketed arc welding torch comprising a handle and a head joined intermediate its ends to said handle at an angle thereto, said head and handle having a common aperture passing through the joint, an electrically conductive electrode holder in said head, electrically conductive electrode contacting means mounted on said holder, a nozzle mounted on said electrode holder and extending beyond said contacting means to form with the electrode an annular gas passage terminating in an annular orifice, a cooling jacket surrounding said electrode holder, means for passing cooling fluid through said handle and common aperture to said jacket, and a gas tube passing through said handle and common aperture and electrode holder to the interior of said nozzle to flow gas along the electrode through said annular gas passage and out through said orifice.

HARRY T. HERBST.

REFERENCES CITED

The following references are of record in the file of this patent:

UNITED STATES PATENTS

| Number | Name | Date |
|---|---|---|
| 1,031,710 | Hanaman | July 9, 1912 |
| 1,192,879 | Ferrell | Aug. 1, 1916 |
| 1,707,433 | Hand | Apr. 2, 1929 |
| 1,878,790 | Lund | Sept. 20, 1932 |
| 1,907,845 | Macrae et al. | May 9, 1933 |
| 2,063,467 | Southgate | Dec. 8, 1936 |
| 2,106,692 | Embleton | Jan. 25, 1938 |
| 2,184,335 | Chapman | Dec. 26, 1939 |
| 2,184,741 | Hartmann | Dec. 26, 1939 |
| 2,223,726 | Hodnette | Dec. 3, 1940 |
| 2,306,050 | Frischmann | Dec. 22, 1942 |
| 2,314,628 | Pavlecka | Mar. 23, 1943 |
| 2,376,265 | Meredith | May 15, 1945 |
| 2,419,053 | Bennett | Apr. 15, 1947 |